United States Patent
Park et al.

(10) Patent No.: US 7,983,028 B2
(45) Date of Patent: Jul. 19, 2011

(54) ASSEMBLY STRUCTURE OF A DISPLAY DEVICE

(75) Inventors: Jong-Myeong Park, Cheonan-si (KR); Jae-Hwan Chun, Suwon-si (KR); Jong-Ho Won, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 201 days.

(21) Appl. No.: 12/346,941

(22) Filed: Dec. 31, 2008

(65) Prior Publication Data

US 2009/0180247 A1 Jul. 16, 2009

(30) Foreign Application Priority Data

Jan. 11, 2008 (KR) .................................. 2008-3368

(51) Int. Cl.
*H05K 5/00* (2006.01)
*H04M 7/00* (2006.01)
*G09G 5/00* (2006.01)
*G09G 5/08* (2006.01)

(52) U.S. Cl. ................ 361/679.21; 361/679.22; 349/58; 345/905

(58) Field of Classification Search ............. 361/679.01, 361/679.02, 679.08, 679.09, 679.3, 679.55–679.59, 361/679.21; 345/156, 157, 168, 169, 184; 455/325, 556.1, 550.1, 90.1, 575.1, 575.3, 455/575.4, 575.8
See application file for complete search history.

(56) References Cited

U.S. PATENT DOCUMENTS

| | | | |
|---|---|---|---|
| 6,532,152 B1 * | 3/2003 | White et al. | 361/692 |
| 2008/0030641 A1 * | 2/2008 | Kim et al. | 349/58 |
| 2008/0130212 A1 * | 6/2008 | Jeong et al. | 361/681 |

* cited by examiner

*Primary Examiner* — Zachary M Pape
*Assistant Examiner* — Jerry Wu
(74) *Attorney, Agent, or Firm* — Cantor Colburn LLP

(57) ABSTRACT

A display device includes a display module, a first case and a boss insertion element having a combination hole. The first case covers a first surface of the display module and has a first boss which is inserted into the combination hole to combine the front case to the display module. The first boss is formed at inside edges of the display module.

20 Claims, 7 Drawing Sheets

ASSEMBLY STRUCTURE OF A DISPLAY DEVICE

This application claims priority to Korean Patent Application No. 2008-0003368, filed on Jan. 11, 2008, and all the benefits accruing therefrom under 35 U.S.C. §119, the contents of which in its entirety are herein incorporated by reference.

BACKGROUND OF THE INVENTION

1. Field of the Invention

The present invention relates to a display device. More particularly, the present invention relates to a display device having a reduced overall size.

2. Description of the Related Art

A liquid crystal display device ("LCD") includes a backlight assembly which provides light and an LCD panel which displays images using the light from the backlight assembly.

The LCD device is widely as a display device used because it has a relatively small size, is lightweight, and is driven by relatively low power consumption and driving voltage. In particular, the LCD device is becoming more widely used for large-sized electronic devices, such as televisions.

An outside surface of the LCD device is generally covered by a chassis that is made of a metal material. The LCD device used for large-sized electronic devices is covered by front and rear cases to protect the LCD device from external impact and to provide visual appeal of the LCD device covered by the chassis. The front and rear cases are made of a plastic material.

A bracket is employed at edges of the LCD device to combine the front and rear cases together. In particular, first and second bosses are formed on the front and rear cases, and then the front and rear cases are combined using the first and second bosses with the bracket. The bracket includes the metal material having a same thermal expansion as that of the chassis. The first and second bosses are integrally formed with the front and rear cases, thus the first and second bosses are formed of plastic material.

However, the above-mentioned configuration adds to the overall size of a resulting display device due to the bracket. In addition, when the first and second bosses are formed from different materials than those of the bracket, thermal expansions of the bosses are different from a thermal expansion of the bracket, so that the bosses and the bracket may come in contact, resulting in noise.

BRIEF SUMMARY OF THE INVENTION

The present invention provides a display device having a boss fixing member to decrease the overall size of the display device.

In an exemplary display device according to the present invention, the display device includes a display module and a first case. The display module includes a boss insertion element having a combination hole and a first receiving frame which receives a mold frame of the display module. The boss insertion element has a portion disposed between the mold frame and the first receiving frame. The first case covers a first surface of the display module and has a first boss which is inserted into the combination hole to combine the front case to the display module. The first boss is formed at inside edges of the display module.

The display device further includes a second case covering a second surface of the display module opposite to the first surface thereof, and having a second boss which is formed to correspond to a location of the first boss and is inserted into the combination hole.

The boss insertion element is disposed at corners of the display module. The boss insertion element includes an elastic material. For example, the boss insertion element includes rubber.

The combination hole has a shape corresponding to cross-sectional shapes of the first and second bosses. Each of the first and second bosses may have a conical shape, and the combination hole may have a circular shape.

The boss insertion element includes a protrusion portion formed on an inside surface of the combination hole. The protrusion portion may have a hemispherical shape.

The first and second bosses may be combined with each other in the combination hole. The boss insertion element may be disposed at an outer end of a side of the display module.

The combination hole may include a first combination hole to receive and fix the first boss and a second combination hole to receive and fix the second boss. A separation material may be disposed between the first and second combination holes.

In another exemplary display device according to the present invention, a method for fabricating a display device is disclosed. The method includes: inserting a body of a boss insertion element into a hole formed on a mold frame such that a fixing plate extending laterally from the body of the boss contacts the mold frame, the body of the boss insertion element defining a combination hole; putting the mold frame in a first receiving frame; and inserting a boss protruding from a first case covering a first surface of a display module into the combination hole.

Insertion of the body of the boss insertion element into the hole formed on the mold frame includes: inserting the boss insertion element into the hole formed on the mold frame until the fixing plate having a larger cross section than the area of the hole passes through said hole.

In yet another exemplary display device according to the present invention, a method for fabricating a display device is disclosed. The method includes: inserting a boss insertion element including a combination hole and a fixing plate into a hole formed on a mold frame until the fixing plate contacts an outer portion of the mold frame; rotating the boss insertion element to a predetermined angle to fix the boss insertion element to the mold frame; disposing the mold frame in a first receiving frame; and inserting a boss protruded from a first case covering a first surface of a display module into the combination hole.

According to the present invention, the display module includes a boss insertion element having a combination hole in which the first boss in the front case and the second boss in the rear case are flexibly inserted, so that the overall size of the display device may be decreased and noise due to differences of heat expansions may be prevented.

BRIEF DESCRIPTION OF THE DRAWINGS

The above and other aspects, features, and advantages of the present invention will become more apparent by describing in further detail exemplary embodiments thereof with reference to the accompanying drawings, in which.

DETAILED DESCRIPTION OF THE INVENTION

Figure 1:
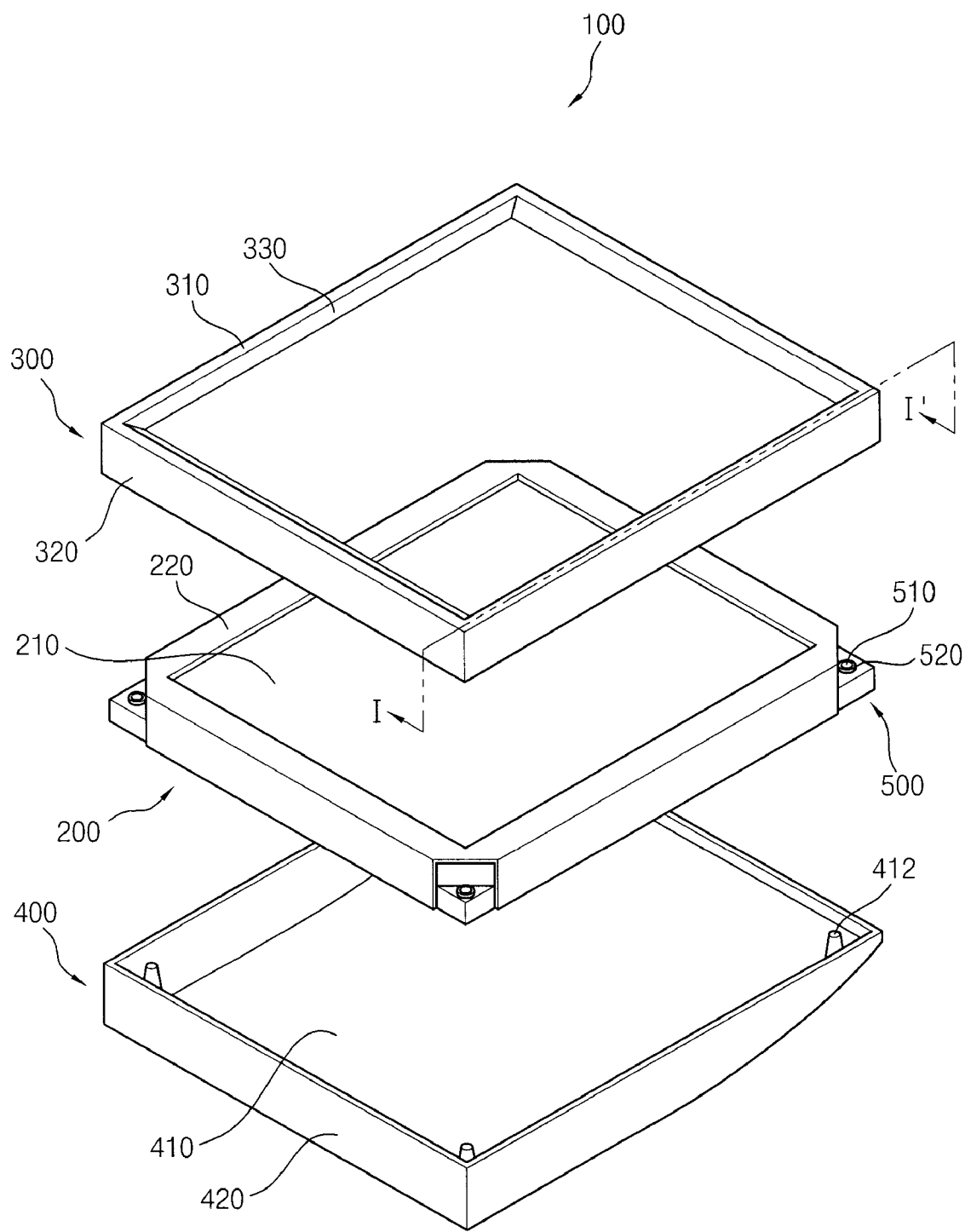
FIG. 1 is an exploded perspective view illustrating an exemplary embodiment of a display device according to the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "upper" relative to other elements or features would then be oriented "lower" relative to the other elements or features. Thus, the term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in further detail with reference to the accompanying drawings.

Figure 2:
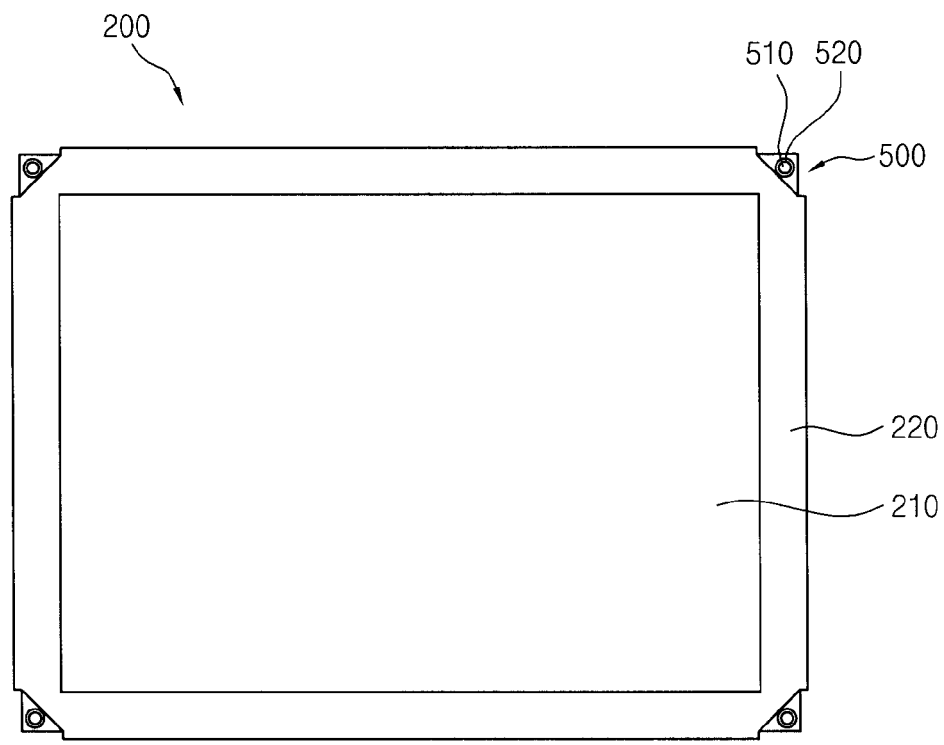
FIG. 2 is a plan view illustrating a display module shown in FIG. 1.
Figure 3:
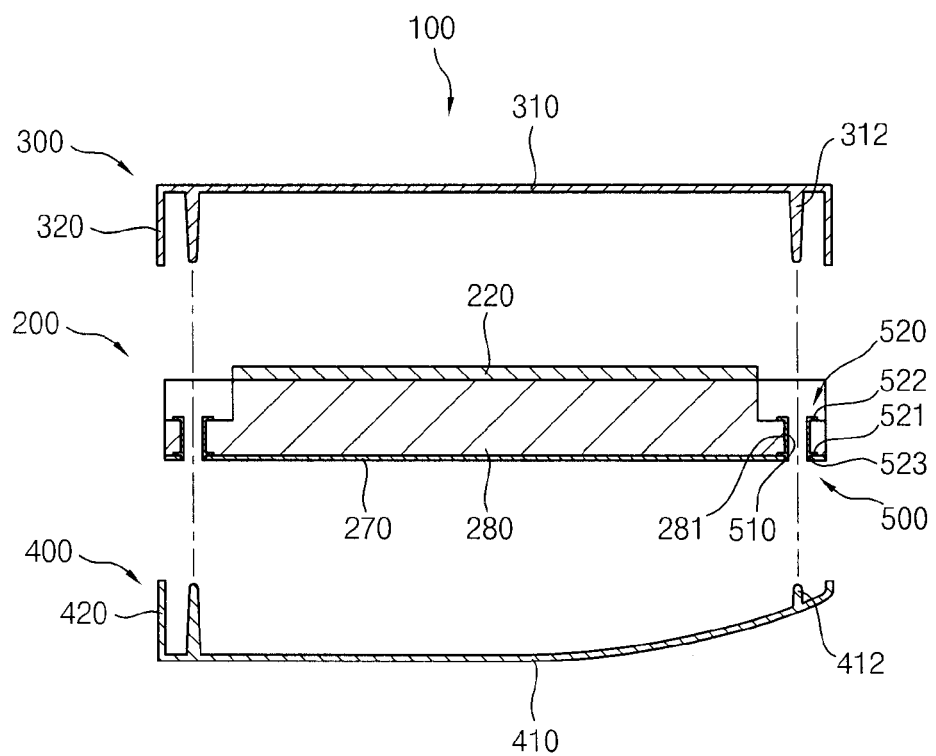
FIG. 3 is a cross-sectional view of the display device of FIG. 1, taken along line I-I'.

FIG. 1 is an exploded perspective view illustrating an exemplary embodiment of an exemplary embodiment of a display device 100 according to the present invention. FIG. 2 is a plan view illustrating a display module 200 shown in FIG. 1. FIG. 3 is a cross-sectional view of the display device of FIG. 1, taken along line I-I'.

Referring to FIGS. 1, 2 and 3, the display device 100 according to the present exemplary embodiment includes the display module 200, a front case 300 and a rear case 400.

The display module 200 includes a display unit 210 which displays an image, a bottom chassis 270 and mold frame 280 receiving the display unit 210 and a top chassis 220 covering a peripheral area of the display unit 210 and being coupled to the bottom chassis 270. The bottom chassis 270 and the top chassis 220 may also be referred to a first receiving frame 270 and a second receiving frame 220, respectively. The display unit 210 is divided into a display area and the peripheral area covered by the top chassis 220. The top chassis 220 includes an opening to correspond to the display area of the display unit 210 in which the image is displayed. The top chassis 220 includes a metal material having thermal expansion and thermal contraction rates lower than that of a plastic material, for example.

The display module 200 may be a liquid crystal display ("LCD") device which displays an image by using a liquid crystal. The LCD device includes an LCD panel which displays the image and a backlight assembly (not shown) which provides light to the LCD panel. The LCD panel includes two substrates (not shown) and a liquid crystal layer (not shown) disposed between the two substrates. Alternatively, the display module 200 may include an organic light emitting display ("OLED") device which displays the image using an organic light-emitting element or a plasma display device which displays the image using plasma.

Upon assembly, the front case 300 covers a first surface of the display module 200. For example, when the display module 200 is an LCD device, the front case 300 may cover an upper surface of the LCD panel. The front case 300 includes a front cover portion 310 disposed substantially parallel with the first surface of the display module 200, and a front extension portion 320 extended downward from a first edge of the front cover portion 310 to collectively cover the display module 200. The front extension portion 320 may be formed to extend perpendicular to the front cover portion 310.

The front case 300 has a substantially rectilinear frame shape. The front cover portion 310 of the front case 300 is substantially open to correspond to the display area of the display unit 210, so that an image displayed by the display module 200 is exposed to the outside. The front cover portion 310 may cover only an upper surface of the top chassis 220. Alternatively, the front cover portion 310 may include a transparent material corresponding to the display area.

The front case 300 may further include a front curved portion 330 (e.g., beveled or tapered) extending from a second edge of the front cover portion 310 corresponding to an inner side of the front cover portion 310 and toward the display unit 210. The front curved portion 330 prevents foreign material from entering into the display module 200. Additionally, the front curved portion 330 may further include a gasket (not shown) having a sealing material in an end portion (e.g., inner most end defining the opening of the front case) of the front curved portion 330. Alternatively, the front case 300 may include a gasket instead of the front curved portion 330.

The front case 300 includes a first boss 312 disposed at a corner thereof. The first boss 312 protrudes from a lower surface of the front cover portion 310 of the front case 300. The first boss 312 may have a tapered shape in which a diameter of the boss 312 becomes smaller as the first boss extends away from the front cover portion 310. For example, the first boss 312 may have substantially a conical shape. Alternatively, the first boss 312 may have a poly-prism shape. For example, the first boss 312 may have a diameter of about 12 mm at a contacting portion with the front cover portion 310, and may have a diameter of about 8 mm at a portion farthest away from the front cover portion 310.

The first boss 312 may have the above-mentioned shape so that the first boss 312 is more easily inserted into a combination hole 510, as will be explained further herein. The first boss 312 may be integrally formed with the front cover portion 310 as a unitary indivisible part. Alternatively, the first boss 312 and the front cover portion 310 may be separately formed, and then combined with each other. In this latter embodiment, a combining element such as a bolt or an adhesive, for example, but is not limited thereto, may be used to combine the first boss 312 and the front case 300. The front case 300 may be formed from plastic material having thermal expansion and thermal contraction rates higher than those of a metal material.

The rear case 400 covers a second surface of the display module 200 that is opposite to the first surface of the display module 200. The first surface of the display module 200 is covered by the front case 300. The rear case 400 includes a rear cover portion 410 directly covering the second surface of the display module 200, and a rear extension portion 420 extending upwardly from an edge portion of the rear cover portion 410 to be combined with the front extension portion 320 of the front case 300. The rear extension portion 420 may be formed to be substantially perpendicular to the rear cover portion 410. The rear case 400 substantially has a shape to receive the display module 200.

When the display device 100 according to the present exemplary embodiment is used in an upright position (not shown), one of the rear extension portions 420 may be longer than others of the rear extension portions 420 to enhance stability. In addition, the rear cover portion 410 and one or more of the rear extension portions 420 of the rear case 400 may have a curved shape (as illustrated in FIGS. 1 and 3) to provide enhanced visual appeal.

In an exemplary embodiment, a second boss 412 is formed at least one corner of the rear cover portion 410 of the rear case 400. In an exemplary embodiment, the second bosses 412 are formed at all corners on an upper surface of the rear cover portion to extend in a direction toward the display module 200. In addition, the second bosses 412 may be formed in a location on the rear cover portion 410 corresponding to a location in which the boss fixing members 500 and first bosses 312 are formed. The second boss 412 may be formed to be longer than the first boss 312 so that a control main board controlling the display module 200 and electronic devices for enhancing a user's experience are mounted on the rear surface of the display module 200, thereby requiring additional space. The second boss 412 may have the same characteristics as those of the first boss 312, and thus any further repetitive explanation concerning the second boss 412 will be omitted.

The display module 200 has the boss fixing member 500 disposed at a location corresponding to the location of the first and second bosses 312 and 412. For example, the boss fixing member 500 may be disposed at corners of the display module 200. In an exemplary embodiment, the boss fixing member 500 is formed at outer edges of the display module 200. The boss fixing member 500 may be formed by removing a portion of the display module 200 and disposing a boss insertion element 520 at its corner edges. As shown in FIG. 1, a portion of the corners of the display module 200 are removed at substantially 45 degree angles except for a base portion thereof having a reduced thickness to provide the boss fixing member 500.

When the display module 200 is a liquid crystal display device, the boss fixing member 500 may be formed by changing a shape of a mold frame 280 and bottom chassis 270 of the backlight assembly, disposing a boss insertion element 520 and exposing a combination hole 510 in the LCD device as shown in FIG. 3. The top chassis 220 may have a structure in which a portion of an edge of the top chassis 220 is cut away to expose the boss fixing member 500 to the outside, as illustrated in FIG. 3.

The boss fixing member 500 simultaneously fixes the first and second bosses 312 and 412 with respect to the front case 300 and the rear case 400, respectively, by the boss insertion element 520. The boss fixing member 500 is formed at inside portions of the corners of the display module 200, and without the use of a bracket, thereby reducing an overall size thereof.

The combination hole 510 into which the first and second bosses 312 and 412 are inserted, is formed in the boss insertion element 520. An entrance of the combination hole 510 may be chamfered for the first and second bosses 312 and 412 to be smoothly inserted into the combination hole 510.

In an exemplary embodiment, the boss insertion element 520 includes an elastic material around the combination hole 510. For example, the boss insertion element 520 may be formed of a rubber material. Thus, the boss insertion element 520 may be flexibly adjusted in accordance with heat expansion of the first and second bosses 312 and 412. Alternatively, the boss insertion element 520 may include a foam resin having a plurality of pores. In addition, the boss insertion element 520 may include a silicone material having good oxidation resistance and durability. In addition, the boss insertion element 520 may include a viton material having good corrosion and wear resistance.

The boss insertion element 520 comprises a supporting plate 521 and a protruding portion 523. The supporting plate 521 protrudes outwardly from the boss insertion element 520 and contacts the bottom chassis 270. The protruding portion 523 of the boss insertion element 520 protrudes from the supporting plate 521 and is inserted into the hole of the bottom chassis 270 formed for exposing the combination hole 510 of the boss insertion element 520. The portion of the boss insertion element 520 inserted into the hole of the bottom chassis 270 is limited by the height of the protruding portion 523. The supporting plate 521 supports the boss insertion element 520 and the bottom chassis 270 by contacting the bottom chassis 270. Also, the supporting plate 521 prevents most or other alien substances from flowing in by isolating the inside of the display module 200.

The boss insertion element 520 may be received by a recess corresponding to the outer surface of the boss insertion element 520 of the mold frame 280 having a hole 281 for exposing the combination hole 510.

Advantageously, when the combination hole 510 is broken, only the boss insertion element 520 of the boss fixing member 500 needs to be changed or repaired. Thus configured, the boss fixing member 500 including the boss insertion element 520 combinable with and separable from the boss fixing member 500, facilitates easy maintenance and repair and reduces manufacturing costs thereof.

In addition, although the outer diameters of the first and second bosses 312 and 412 may be changed, only the boss insertion element 520 having combination holes 510 need to be changed, thereby enhancing workability.

The boss insertion element 520 may include a fixing plate 522. The fixing plate 522 protrudes outside of the boss insertion element 520. As showed in FIG. 3, the supporting plate 521 and the fixing plate 522 are opposed to each other and contact opposing surfaces of the mold frame having a reduced thickness alternately. The area of the hole 281 of the mold frame 280 is smaller than the cross section of the fixing plate 522. The boss insertion element 520 is inserted into the hole 281 and the protrusion portion 523 is passed through the hole 281 by pressure applied to the boss insertion element 520 because it is formed of an elastic material. The boss insertion element 520 is fixed to the mold frame 280 more securely because the supporting plate 521 and the fixing plate 522 contact both surfaces sides of the mold frame 280.

Since the first and second bosses 312 and 412 generally have tapered outer diameters between about 8 mm to about 12 mm, the combination hole 510 has a corresponding inner diameter to accommodate the first and second bosses 312 and 412. For example, the inner diameter of the combination hole 510 may be between about 8.5 mm to about 10 mm. In addition, the combination hole 510 may have an elongated shape corresponding to lengths and shapes of respective first and second bosses 312, 412. Additionally, the boss combination hole 510 may have a circular shape when viewed from a top plan view.

The boss fixing member 500 may have a predetermined thickness to accommodate and simultaneously fix the first and second bosses 312 and 412, regardless of the thickness of the display module 200. However, the boss fixing member 500 may have a thinner thickness to guide the combination of the first or second boss 312 or 412 with the boss insertion element 520. According to the exemplary embodiments shown in FIGS. 1 to 3, the thickness of boss fixing member 500 may be about half the thickness of the display module 200.

Meanwhile, predetermined combination holes such as a hook may be formed in the front extension portion 320 of the front case and the rear extension portion 420 of the rear case 400 instead of the boss fixing member 500, so that the front and rear cases 300 and 400 may be aligned and combined with each other.

As indicated above, the display device 100 according to the present exemplary embodiment includes the boss fixing member 500 formed at corners of the display module 200, and the boss fixing member 500 includes the boss insertion element 520 having the combination hole 510 through which the first boss 312 formed in the front case 300 and the second boss 412 formed in the rear case 400 are flexibly combined with each other, so that noise and cracks due to differences in heat expansion and contraction rates, when the first and second bosses 312 and 412 are fixed by using a conventional bracket having the metal material, may be prevented. In addition, the overall size of the display device 100 may be decreased by eliminating the conventional bracket.

Figure 4:
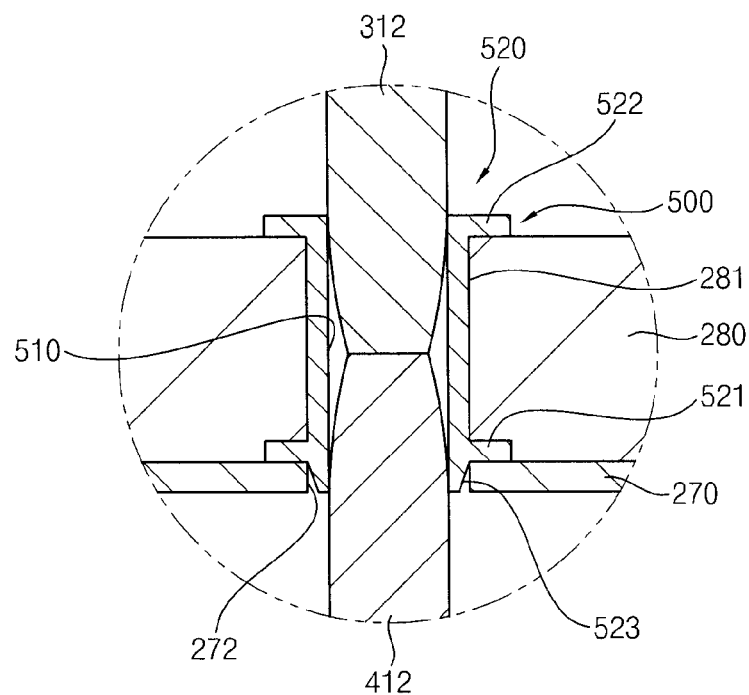
FIG. 4 is an enlarged view illustrating an exemplary embodiment of a combination between first and second bosses shown in FIG. 3.

FIG. 4 is an enlarged view illustrating an exemplary embodiment of a combination between first and second bosses shown in FIG. 3.

Referring to FIGS. 3 and 4, the first boss 312 in the front case 300 and the second boss 412 in the rear case 400 are combined with each other in the combination hole 510.

The combination hole 510 may be formed in one of the first and second bosses 312 and 412, so that the other first and second bosses 312 and 412 may be combined in the combination hole 510. Alternatively, a push-type hook may be formed in one of the first and second bosses 312 and 412, and a combination groove combined with the hook may be formed in the other first and second bosses 312 and 412. Alternatively, magnets may be combined at end portions that face each other of the first and second bosses 312 and 412.

Advantageously, the front and rear cases 300 and 400 are independently combined with each other regardless of the display module 200, so that assembly of the front and rear cases 300 and 400 maybe easily controlled.

Figure 5:
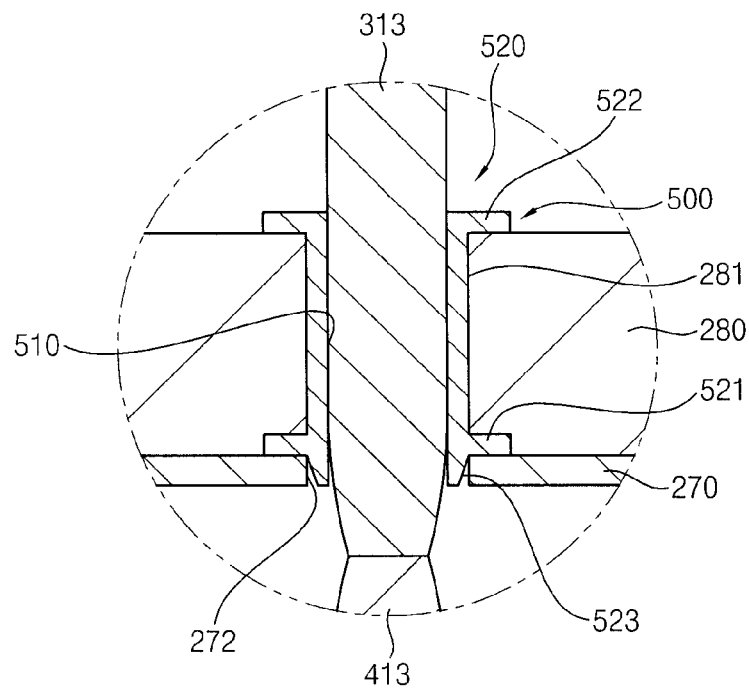
FIG. 5 is an enlarged view illustrating another exemplary embodiment of a combination between first and second bosses shown in FIG. 3.

FIG. 5 is an enlarged view illustrating another exemplary embodiment of a combination between first and second bosses shown in FIG. 3.

Referring to FIG. 5, a first boss 313 and a second boss 413 are combined with each other at the outside of the combination hole 510.

For example, the first boss 313 passes completely through the combination hole 510, and is then combined with the second boss 413. Alternatively, the second boss 413 may pass completely through the combination hole 510 and then combined with the first boss 313.

Advantageously, the first and second bosses 313 and 413 are combined with each other at the outside of the combination hole 510, so that the combination between the first and second bosses 313 and 413 may be visually inspected.

Figure 6:
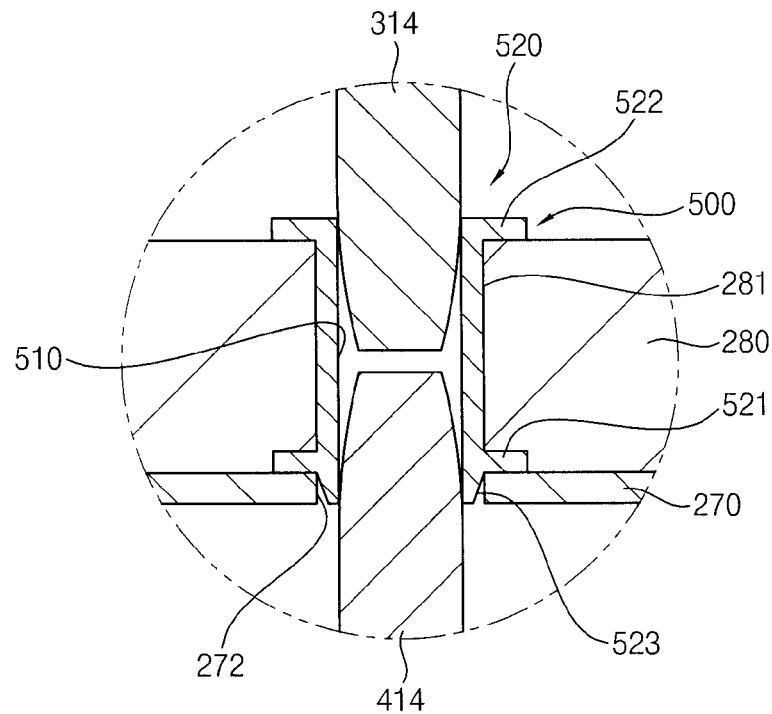
FIG. 6 is an enlarged view illustrating another exemplary embodiment of a combination between first and second bosses shown in FIG. 3.

FIG. 6 is an enlarged view illustrating another exemplary embodiment of a combination between the first and second bosses shown in FIG. 3.

Referring to FIG. 6, a first boss 314 is separated from a second boss 414 when the front case 300 is combined with the rear case 400.

For example, a predetermined space is formed between the first and second bosses 314 and 414. The first and second bosses 314 and 414 may be fixed only by the boss fixing member 500. In other words, the front and rear cases 300 and 400 in FIG. 3 are stably fixed to the display module 200 and not fixed to each other.

Since the first boss 314 is separated from the second boss 414, although the first and second bosses 314 and 414 are expanded by the heat expansions of the first and second bosses 314 and 414, cracks formed due to the heat expansions may be prevented. In addition, costs for manufacturing the first and second bosses 314 and 414 maybe decreased.

Figure 7:
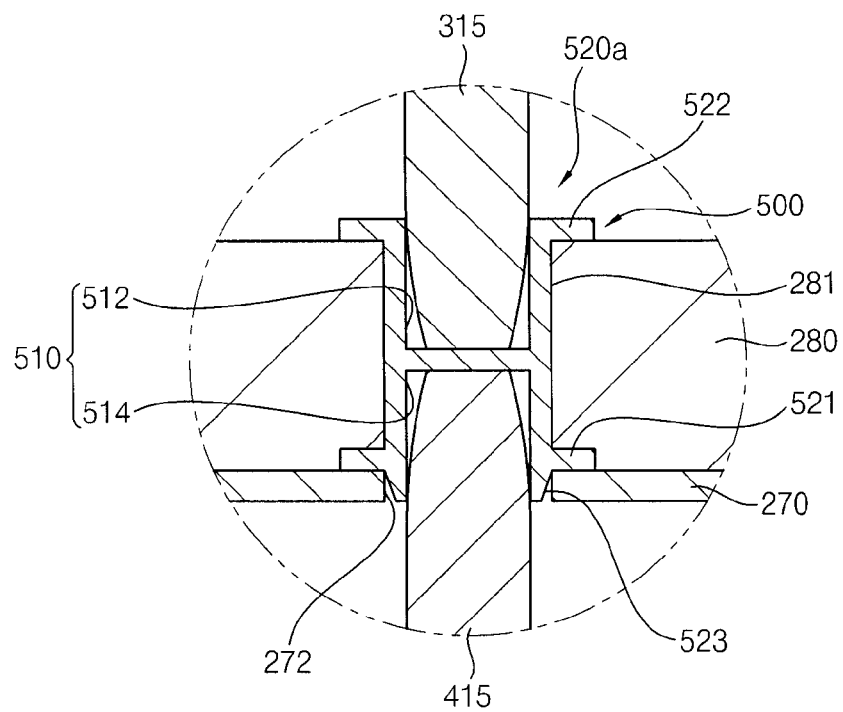
FIG. 7 is an enlarged view illustrating another exemplary embodiment of a combination between first and second bosses shown in FIG. 3.

FIG. 7 is an enlarged view illustrating another exemplary embodiment of a combination between the first and second bosses shown in FIG. 3.

Referring to FIG. 7, a first boss 315 is separated from a second boss 415, and a portion of the boss insertion element 520 is changed to complete a distance between the first and second bosses 315 and 415 when combined.

The boss insertion element 520 includes an elastic material to correspond to the heat expansions of the first and second bosses 315 and 415. For example, the boss insertion element 520 may include a rubber material. Accordingly, the combination hole 510 may be divided into a first combination hole 512 into which the first boss 315 is inserted and a second combination hole 514 into which the second boss 415 is inserted and a material is disposed between the first and second combination holes 512 and 514, respectively.

Figure 8:
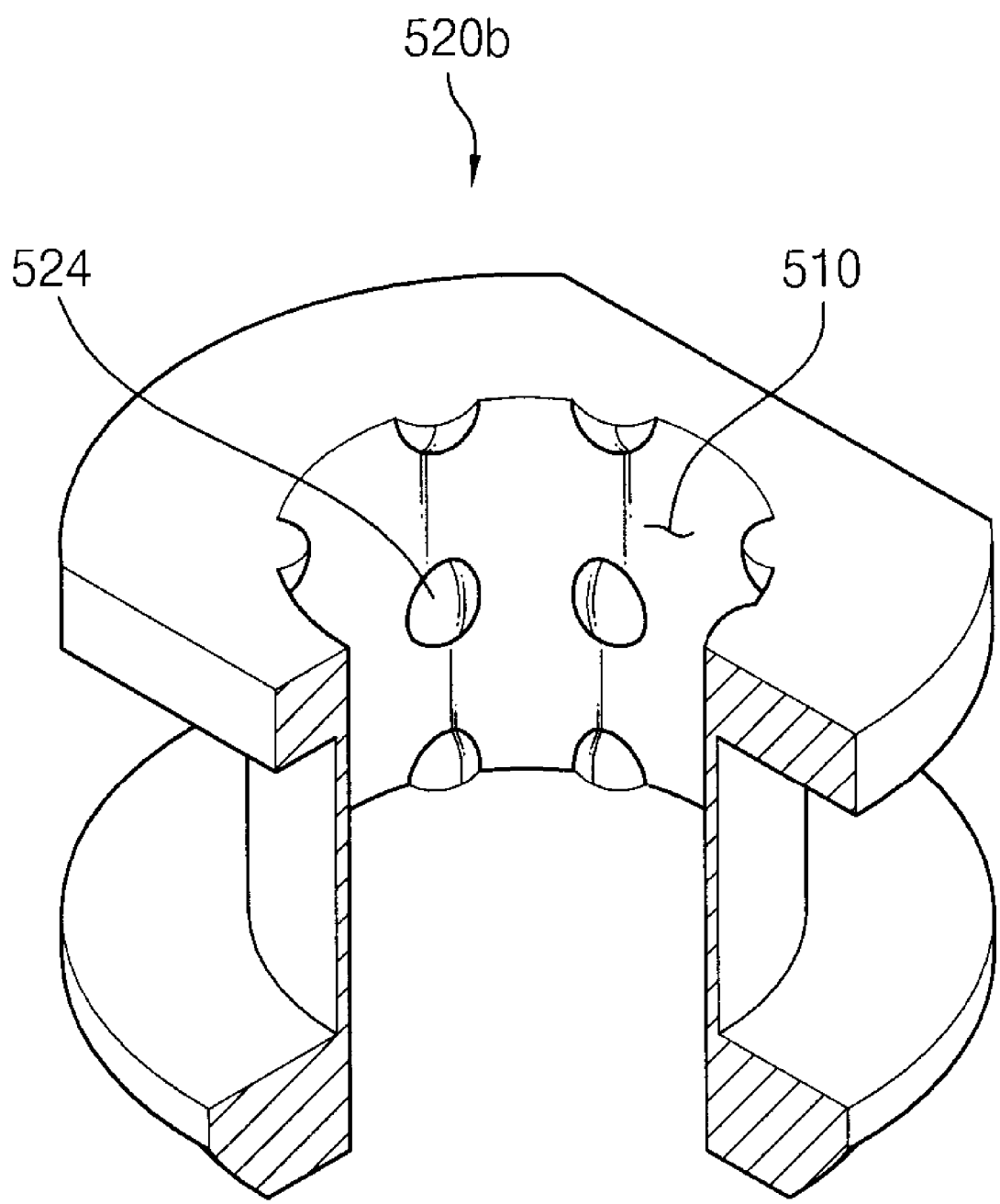
FIG. 8 is a perspective view illustrating another exemplary embodiment of a boss insertion element according to the present invention.

FIG. 8 is a perspective view illustrating another exemplary embodiment of a boss insertion element according to the present invention.

Referring to FIG. 8, a boss insertion element 520b includes a combination hole 510, and a protrusion portion 524 formed on an inside surface of the combination hole 510. The protrusion portion 524 may also be formed at an entrance portion of the combination hole 510, as illustrated in FIG. 8.

The protrusion portion 524 may be simultaneously formed with the boss insertion element 520b. For example, the protrusion portion 524 may be formed of rubber material providing a good frictional force. The protrusion portion 524 may prevent the first and second bosses 312 and 412 from being separated from the combination hole 510 due to frictional force provided by the protrusion portion 524, after the first and second bosses 312 and 412 are inserted into the combination hole 510.

The protrusion portion 524 may have a rounded shape for the first and second bosses 312 and 412 to be smoothly inserted into the combination hole 510. For example, the protrusion portion 524 may have a hemispheric shape, as illustrated in FIG. 8. Alternatively, the protrusion portion 524 may have a rounded band shape along the inside surface of the combination hole 510. In addition, the protrusion portion 524 may include a protruded shape, for example, a center portion of the protrusion 524 is concaved and a peripheral portion of the center portion is roundly protruded.

Advantageously, the boss insertion element 520b includes the protrusion portion 524 which provides a good frictional force formed therein, so that the first and second bosses 312 and 314 are prevented from falling out after being inserted into the combination hole 510. Thus, the combination force between the first and second bosses 312 and 412, and the boss fixing member 500 having the boss insertion element 520b may be enhanced.

Figure 9:
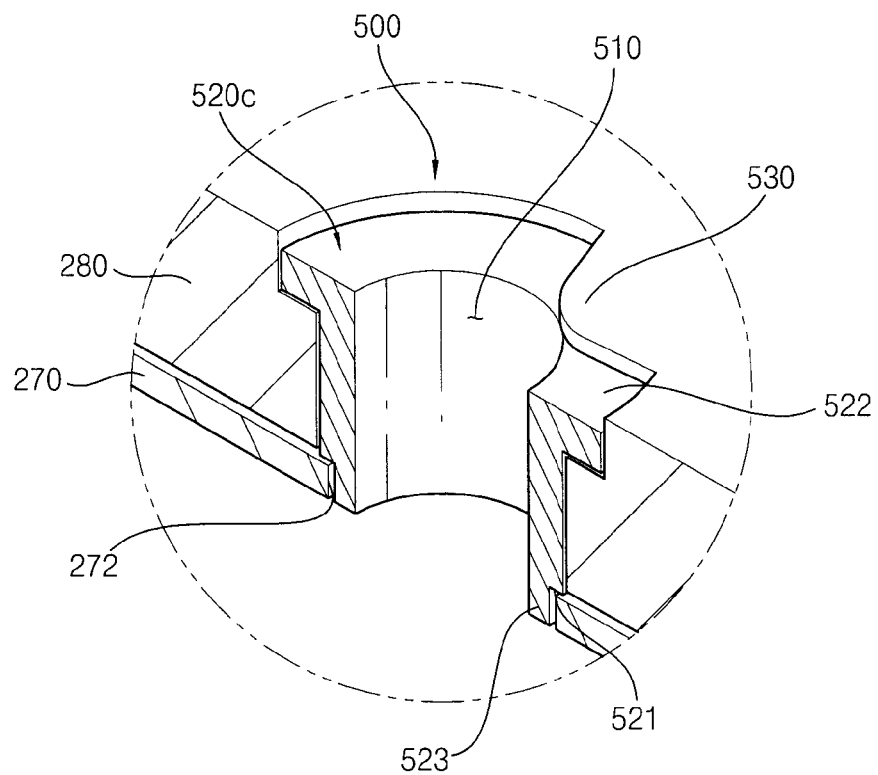
FIG. 9 is a perspective view illustrating another exemplary embodiment of a boss insertion element according to the present invention.

FIG. 9 is a perspective view illustrating another exemplary embodiment of a boss insertion element according to the present invention.

Referring to FIG. 9 the circumference of the boss insertion element 520c is changed in an end portion of the boss insertion element 520c to form a supporting plate 521 and a protruding portion 523. The protruding portion 523 is inserted into the hole of the bottom chassis 270 and the supporting plate 521 contacts the bottom chassis 270. The boss insertion element 520c further includes a fixing plate 522. A protrusion 530 is formed on a portion of the mold frame 280 above the hole 281 (see FIG. 3) of the mold frame 280 to fix the fixing plate 522.

Figure 10:
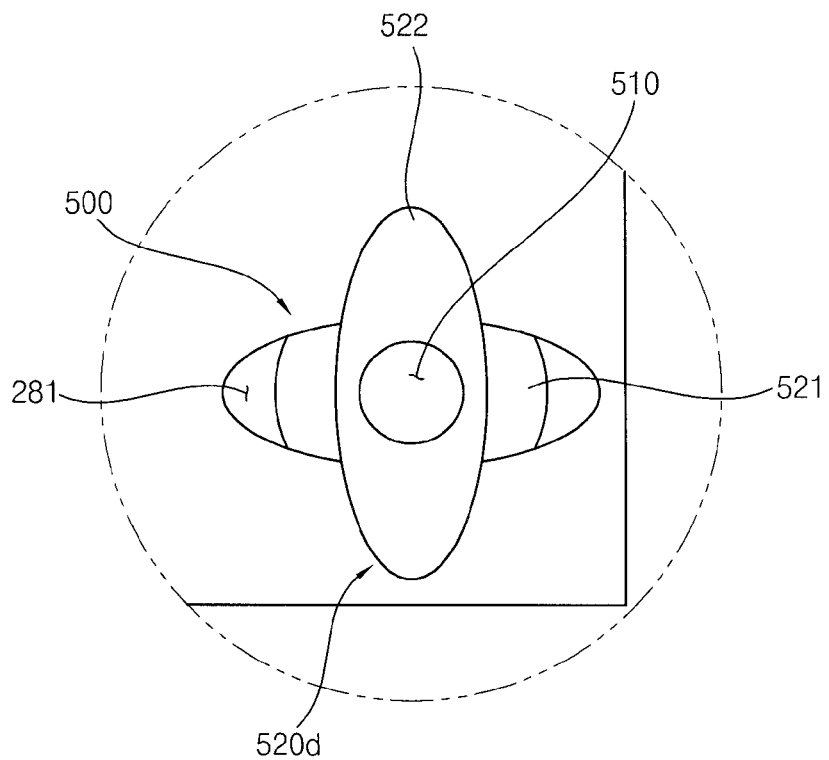
FIG. 10 is a plan view illustrating another exemplary embodiment of a boss fixing member according to the present invention.

FIG. 10 is a perspective view illustrating another exemplary embodiment of a boss fixing member according to the present invention.

FIG. 10 is a plan view illustrating another exemplary embodiment of a boss fixing member according to the present invention.

Figure 11:
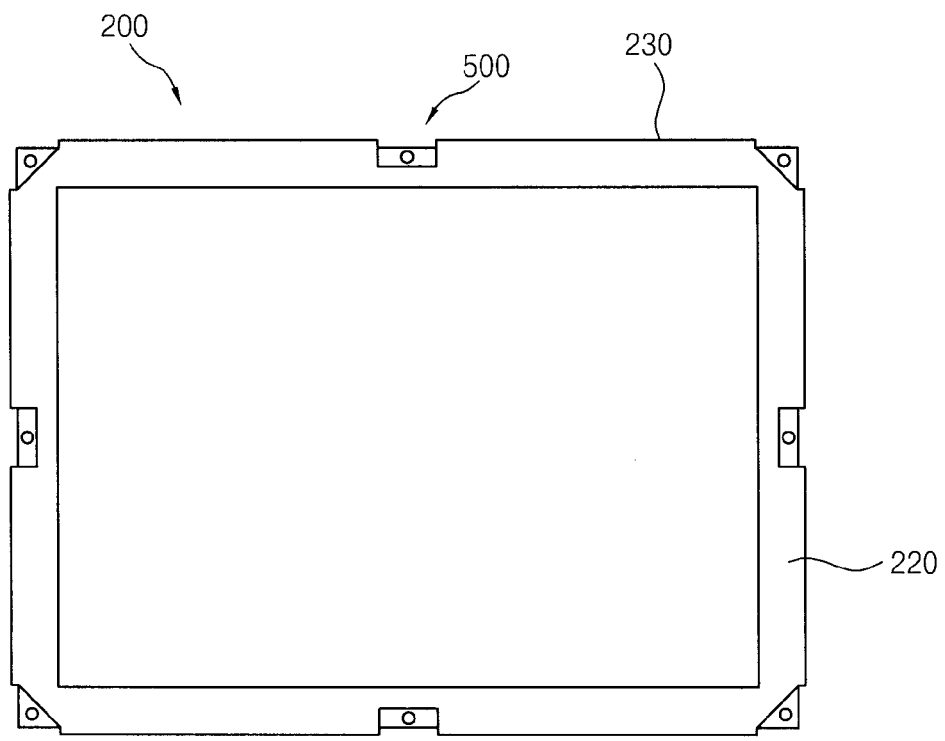
FIG. 11 is a plan view illustrating another exemplary embodiment of a display module of a display device according to the present invention.
Figure 12:
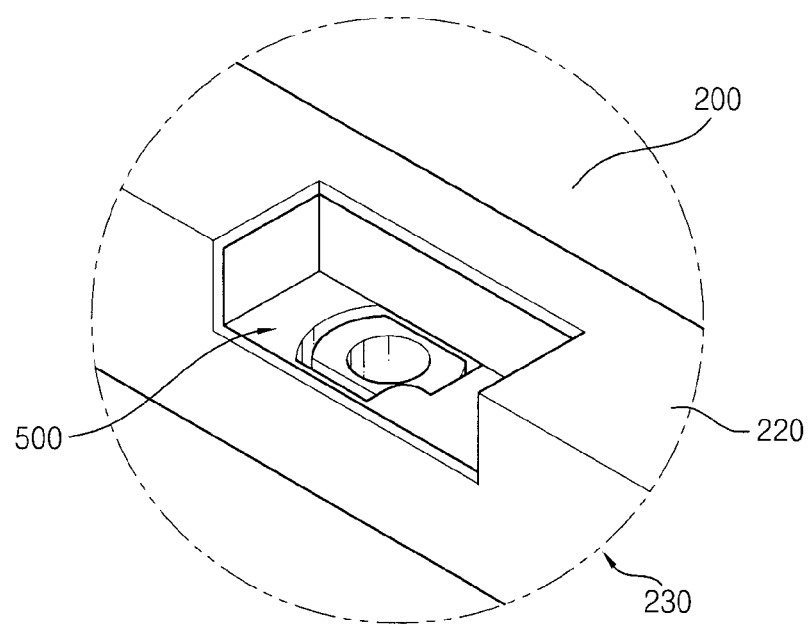
FIG. 12 is a perspective view illustrating a boss fixing member corresponding to a side region of the display module in FIG. 11.

FIG. 11 is a plan view illustrating another exemplary embodiment of a display module of a display device according to the present invention. FIG. 12 is a perspective view illustrating a boss fixing member corresponding to an outer edge portion of the side of the display module in FIG. 11.

The display device according to the present exemplary embodiment may be the same as the display device described in FIGS. 1 to 10, except an additional formation of a boss fixing member. Thus, the same reference numerals will be used to refer to the same or like parts as those described in FIGS. 1 to 10 and any further repetitive explanation concerning the above elements will be omitted.

Referring to FIGS. 11 and 12, a boss fixing member 500 formed in a display module 200 is formed at corners and outer edges of the sides 230 of the display module 200. Alternatively, the boss fixing member 500 may be formed at one of the corners or outer edges of the sides 230 of the display module 200.

The boss fixing member 500 corresponding to the corners has been already explained referring to FIGS. 1, 2 and 3, and thus any further repetitive explanation will be omitted. In addition, the boss fixing member 500 that will be explained is defined to correspond to the outer edges of the sides 230 of the display module 200.

Each of the sides 230 includes a top surface horizontally disposed and parallel with the front and rear cases and a side portion extending vertically from an edge portion of the top surface to form an L-shape. When the display module 200 is the LCD device, one of the side portions of the sides 230 may be relatively longer than another of the side portions of the display module 200. The boss fixing member 500 is formed at the outer edge of the sides 230 which have a relatively longer side portion. Thus configured, when lamps of the backlight assembly in the LCD device are disposed along the relatively longer side, the space provided by the longer side portion accommodates the lamps.

A portion of a display module 200 corresponding to the sides 230 may be cut away in a direction toward the inside of the display module 200, and thus a portion of the sides 230 in which the boss fixing member 500 is formed may have a thinner thickness than that of a remaining portion of the sides 230. Accordingly, a portion of the top chassis 220 corresponding to a location of the boss fixing member 500 may be partially incised.

Having described the exemplary embodiments of the present invention and its aspects, features and advantages, it is noted that various changes, substitutions and alterations may be made herein without departing from the spirit and scope of the invention as defined by the appended claims.

What is claimed is:

1. A display device comprising:
a display module including a boss insertion element having a combination hole and a first receiving frame contacting a lower surface of a mold frame of the display module to support the mold frame, the boss insertion element having a portion perpendicularly extending between the mold frame and the first receiving frame to contact the lower surface of the mold frame and an upper surface of the first receiving frame; and
a first case, the first case covers a first surface of the display module and has a first boss disposed in the combination hole to combine the front case to the display module, wherein the first boss is disposed at inside edges of the display module.

2. The display device of claim 1, wherein the mold frame and the first receiving frame each comprise a hole for exposing the combination hole to the outside of the display module.

3. The display device of claim 2, wherein the mold frame further comprises a recess for receiving the boss insertion element.

4. The display device of claim 2, wherein the boss insertion element comprises a supporting plate which contacts the first receiving frame.

5. The display device of claim 4, wherein the boss insertion element has a protruding portion protruded from the supporting plate and inserted into said hole of the first receiving frame.

6. The display device of claim 4, wherein the boss insertion element further comprises a fixing plate formed thereon being opposite to the supporting plate.

7. The display device of claim 6, wherein the supporting plate and the fixing plate contact the mold frame alternatively being opposite to each other.

8. The display device of claim 6, wherein the supporting plate and the fixing plate are protruded from a main body defining the boss insertion element disposed in the combination hole.

9. The display device of claim 1, wherein the first boss formed on the first case corresponds to a corner of the display module.

10. The display device of claim 1, wherein the boss insertion element includes an elastic material.

11. The display device of claim 10, wherein the boss insertion element includes rubber.

12. The display device of claim 1, further comprising a second case covering a second surface of the display module, which is opposite to the first surface of the display module, the second case having a second boss formed to correspond to a location of the first boss and is inserted into the combination hole of the boss insertion element.

13. The display device of claim 12, wherein the combination hole is formed to correspond to cross-sectional shapes of the first and second bosses.

14. The display device of claim 12, wherein each of the first and second bosses comprises a conical shape, and the combination hole comprises a circular shape.

15. The display device of claim 12, wherein the first and second bosses are combined with each other in the combination hole.

16. The display device of claim 1, wherein the boss insertion element includes a protrusion portion formed on an inside surface of the combination hole.

17. The display device of claim 1, further comprising a second receiving frame coupled to the first receiving frame.

18. A method for fabricating a display device, the method comprising:
inserting a body of a boss insertion element into a hole formed on a mold frame such that a fixing plate extending laterally from the body of the boss contacts an upper surface of the mold frame, the body of the boss insertion element defining a combination hole, the boss insertion element having a portion perpendicularly extending laterally from the body to contact a lower surface of the mold frame; putting the mold frame in a first receiving frame so that the portion of the boss insertion element contacts an upper surface of the first receiving frame; and inserting a boss protruding from a first case covering a first surface of a display module into the combination hole.

19. The method for fabricating a display device according to claim 18, wherein of the inserting the body of the boss insertion element into the hole formed on the mold frame comprises:
inserting the boss insertion element into the hole formed on the mold frame until the fixing plate having a larger cross section than the area of the hole passes through said hole.

20. A method for fabricating a display device comprising:
inserting a boss insertion element including a combination hole and a fixing plate into a hole formed on a mold frame until the fixing plate contacts an outer portion of the mold frame;
rotating the boss insertion element to a predetermined angle to fix the boss insertion element to the mold frame;
disposing the mold frame in a first receiving frame; and
inserting a boss protruded from a first case covering a first surface of a display module into the combination hole.

* * * * *